(12) United States Patent
Huang

(10) Patent No.: US 6,777,013 B2  
(45) Date of Patent: Aug. 17, 2004

(54) METHOD AND DEVICE OF MAKING DOUGH MIXED WITH COOKING OIL, FRUIT AND VEGETABLE FILLING

(76) Inventor: Lien-Fu Huang, P.O. Box No. 6-57, Chung-Ho, Taipei 235 (TW)

( * ) Notice: Subject to any disclaimer, the term of this patent is extended or adjusted under 35 U.S.C. 154(b) by 28 days.

(21) Appl. No.: 10/226,278

(22) Filed: Aug. 23, 2002

(65) Prior Publication Data

US 2004/0035301 A1 Feb. 26, 2004

(51) Int. Cl.$^7$ ............................................. A21D 13/00
(52) U.S. Cl. ........................ 426/501; 426/289; 426/500; 426/512
(58) Field of Search ................................ 426/496, 500, 426/501, 502, 512, 289; 99/450.1

(56) References Cited

U.S. PATENT DOCUMENTS 4,600,595 A * 7/1986 Svengren et al. ........... 426/501
6,165,522 A * 12/2000 Lira ........................... 426/500

\* cited by examiner

Primary Examiner—George C. Yeung

(57) ABSTRACT

The present invention of a method and device of making dough mixed with cooking oil, fruit and vegetable filling, more especially, a forward operation of making a dough chunk of a green onion crepe, is mainly characterized that it continuously provides a thin dough skin of a constant breadth and evenly spreads a layer of oil on the surface thereof; it evenly sprinkles a layer of fruit and vegetable filling on the surface of the layer of oil; it rolls the dough skin with layers of oil and filling into a continuous dough bar to be conveyed outwardly; it cuts the dough bar into a circular cylinder with ring-shaped oil and filling layers spread evenly therein; by virtue of the prevent invention, chunks of dough with evenly mixed shortening layers and the filling layers of fruit and vegetable are manufactured in mass production.

3 Claims, 20 Drawing Sheets

METHOD AND DEVICE OF MAKING DOUGH MIXED WITH COOKING OIL, FRUIT AND VEGETABLE FILLING

BACKGROUND OF THE INVENTION

1) Field of the Invention

The present invention relates to a method and device of making dough mixed with cooking oil, fruit and vegetable filling, more specifically, a manufacturing method and device of preparing upstream dough for making green onion crepes.

2) Description of the Prior Art

Accordingly, the upstream operation of a conventional green onion crepe includes rolling the raw dough into a slightly circular thin piece to be fried or baked as cooked green onion crepe.

However, the upstream operation of making the raw dough of the abovementioned green onion crepe requires the human labor to mix and roll the green onion and the shortening evenly into the raw dough as well as divide the dough into chunks.

The operation has the following shortcomings:

1. It is only suitable for small-scaled and manually handled operations of the street vendors but not for mass production.
2. It is very difficult to evenly mix and roll the chopped green onion or the shortening with the dough; more particularly, it is hard to manually spread the chopped green onion and the shortening into the dough.

In view of the disadvantages of the conventional method, the present invention focuses on researching the issue of how to evenly spread the oil layer and the filling layer in the dough as well as how to manufacture the dough of the forward operation of making the green onion crepe in mass production.

SUMMARY OF THE INVENTION

Therefore, the primary objective of the present invention is provide a method and device of making dough mixed with cooking oil, fruit and vegetable filling so as to manufacture a chunky dough evenly mixed with the shortening and the fruit and vegetable filling therein in mass production.

In order to achieve the abovementioned objectives, the brief description of the drawings below is followed by the detailed description of the preferred embodiment.

DETAILED DESCRIPTION OF THE PREFERRED EMBODIMENTS

Figure 1:
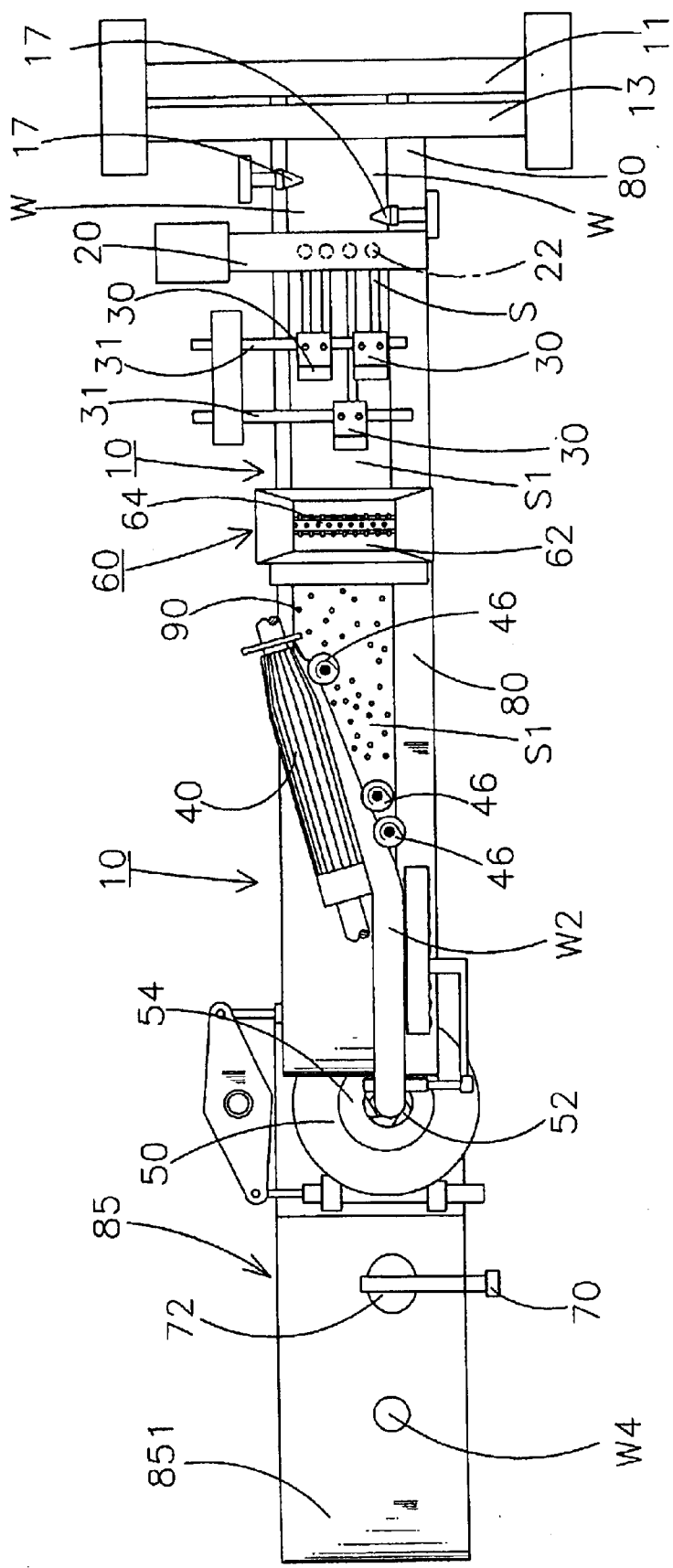
FIG. 1 is a bird's-eye view drawing of the present invention.
Figure 2:
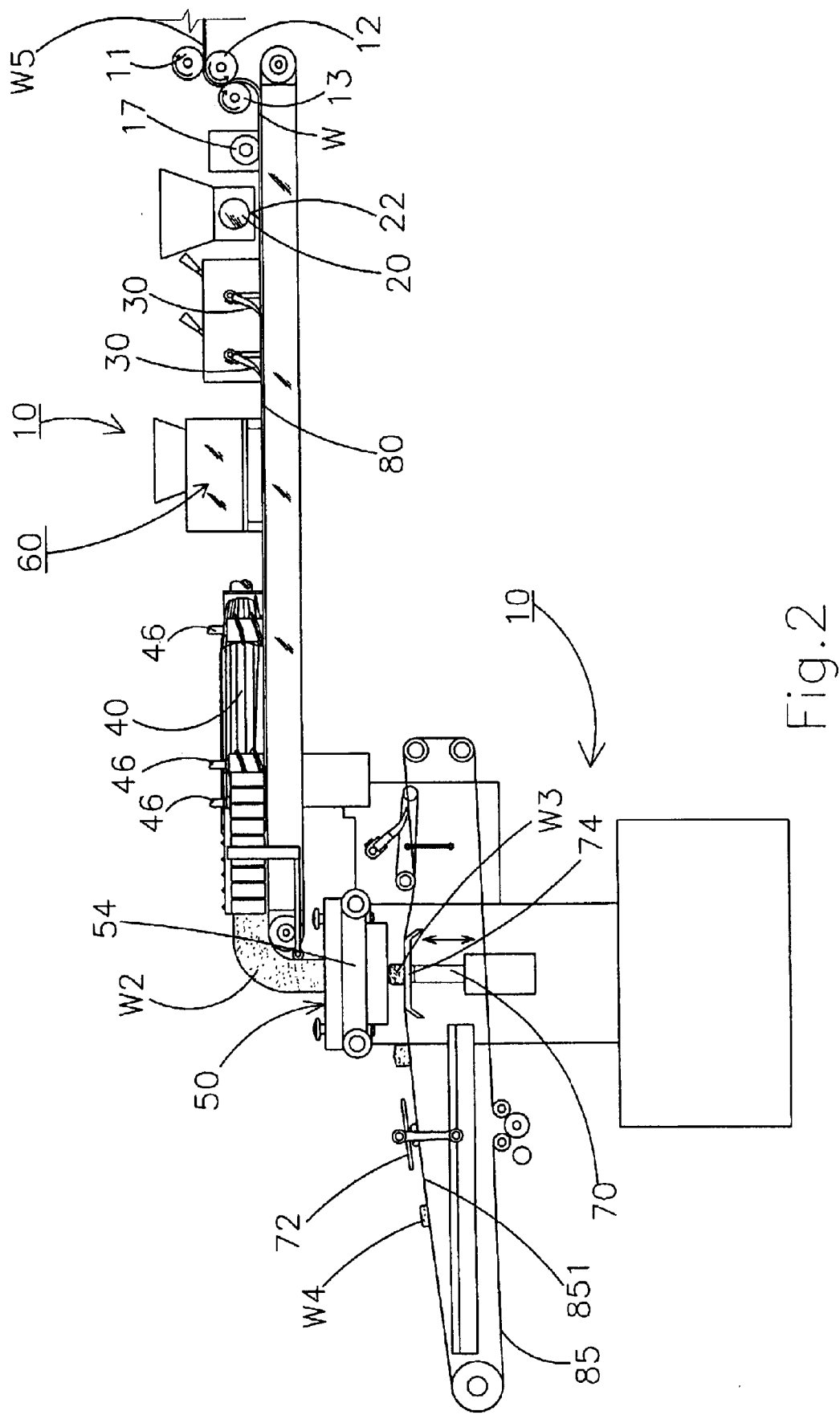
FIG. 2 is a lateral view drawing of the present invention.

Referring to FIGS. 1 and 2, the manufacturing method of the present invention comprises:

(a) providing a thin dough skin (W) to be continuously conveyed through a conveyer belt (80) toward a determined direction;

(b) continuously providing of a plurality of bar-shaped or strap-shaped cooking oil (S) onto the dough skin (W) to have at least one bar of cooking oil (S) spread on the dough skin (W);

(c) evenly plastering the bar-shaped cooking oil (S) into an even and thin layer on the surface of the dough skin (W);

(d) providing evenly and downwardly sprinkling the fruit and vegetable filling (90) on the layer of oil (S1);

(e) rolling the forwarding dough skin (W) as dough bar (W2) thereby evenly covering the layer of oil (W1) as well as the layer of fruit and vegetable filling (90) in ring shapes inside the dough bar (W2);

(f) sequentially cutting the dough bar (W2) conveyed continuously into a plurality of circular cylinders (W3).

Figure 4:
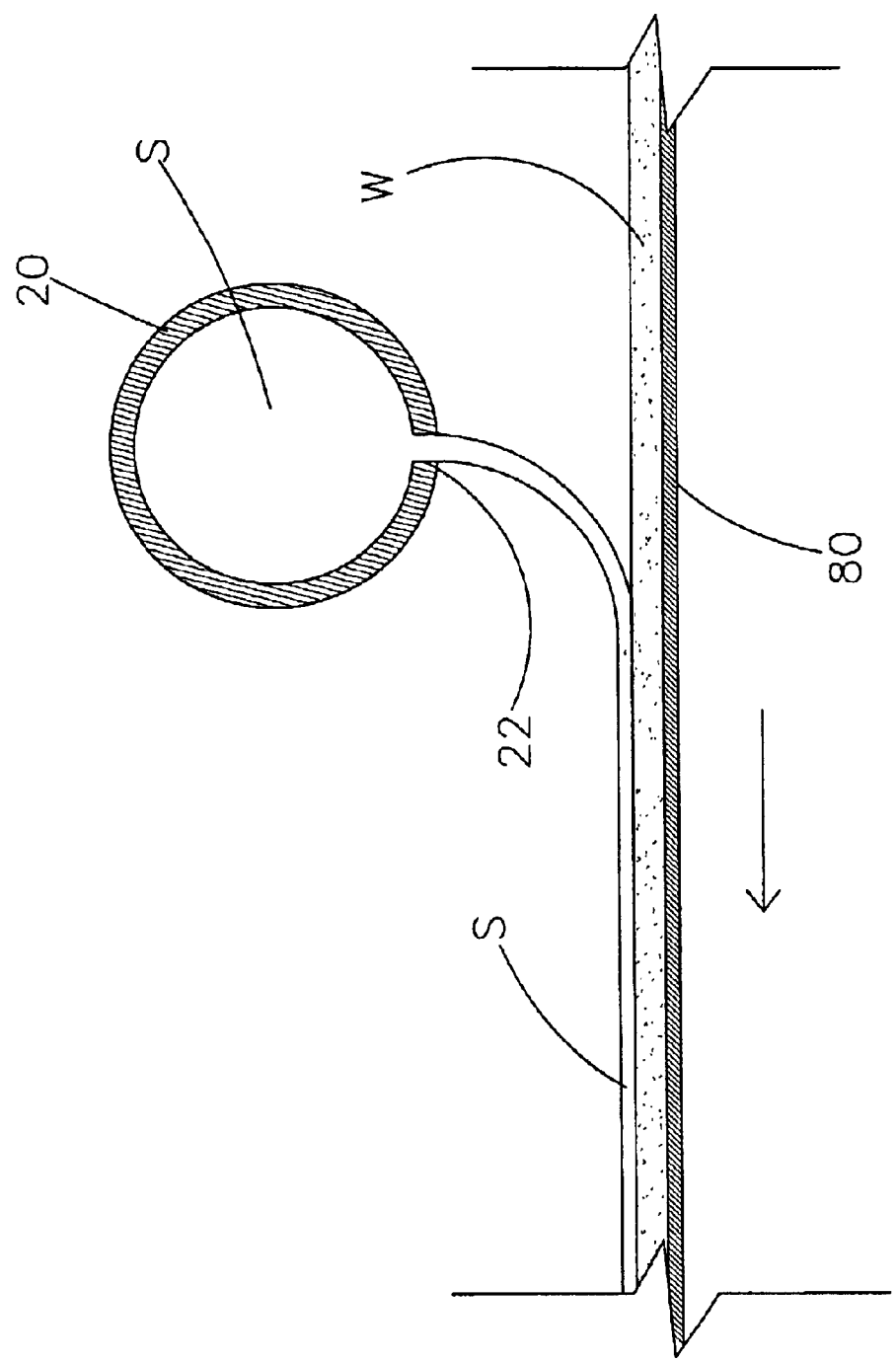
FIG. 4 is a cross-sectional drawing of supplying cooking oil in a bar shape onto the dough skin of the present invention.

A method and device of making dough mixed with cooking oil, fruit and vegetable filling is characterized that a set of a plurality of mangle rollers (11, 12, 13) are disposed mounted on one side of a machine table (10) and capable of mangling a thick dough strap (W5) into the thin dough skin (W), as shown in FIGS. 1 & 2. A conveyer tube (20) holds the cooking oil (S) and has at least a guide hole (22) disposed on the bottom portion thereof; the conveyer tube (20) is mounted at the upper aspect of the conveyer belt (80) thereby guiding the cooking oil (S) through the guide holes (22) to be spread in bar-shapes on the surface of the dough skin (W), as shown in FIG. 4.

Figure 5:
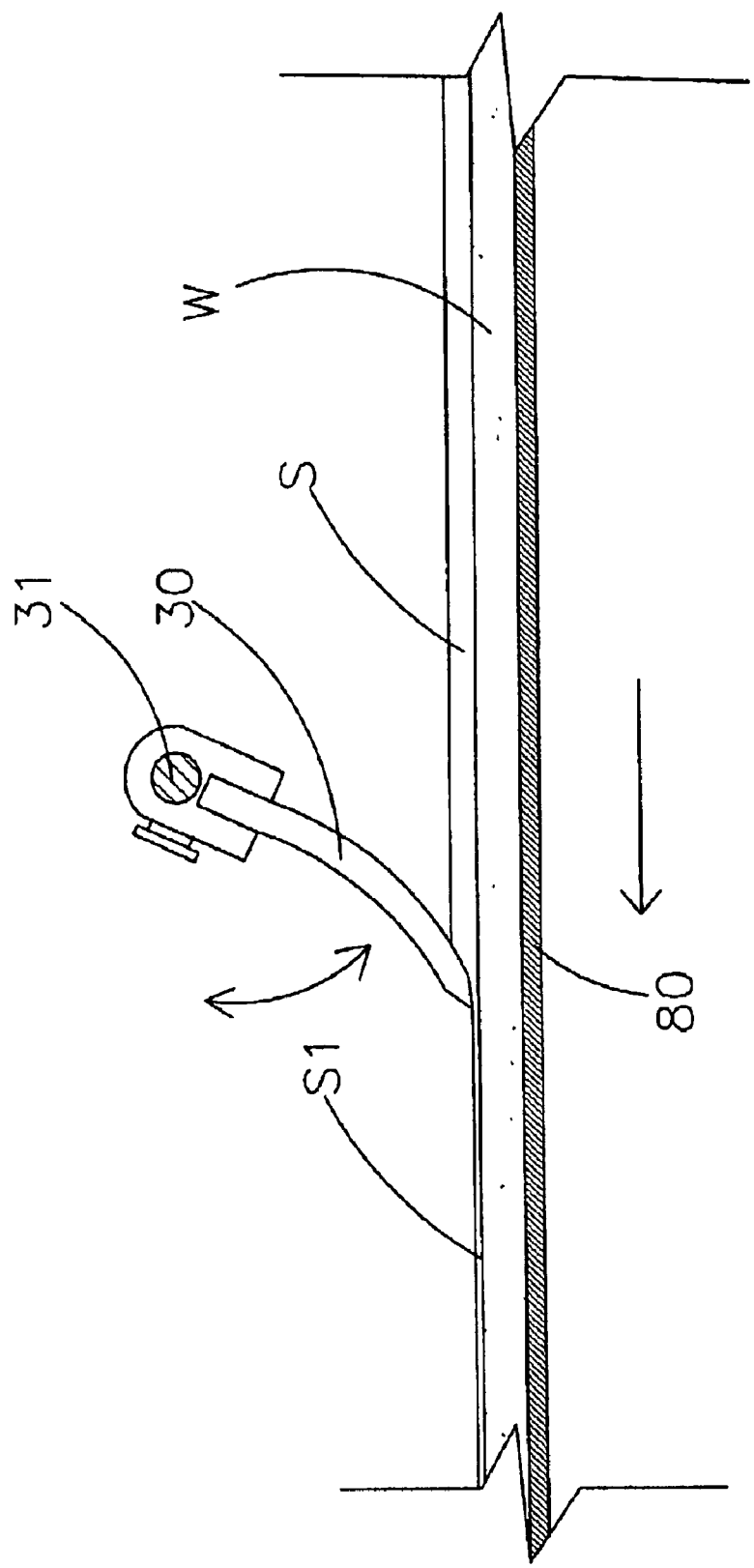
FIG. 5 is a cross-sectional and schematic drawing of a soft scraper brushing the surface of the dough skin of the present invention.

At least more than one piece of soft scrapers (30) are mounted at the upper aspect of the conveyer belt (80) and situated on the rear side of the conveyer tube (20); the soft scraper (30) plasters the bar-shaped cooking oil (S) on the surface of the dough skin (W) on the conveyer belt (80) into planar shapes thereby forming the layer of oil (S1) on the surface of the dough skin (W), as shown in FIG. 5.

As indicated in FIGS. 6, 7, 8 and 9, a granulated filling sprinkle device (60) is mounted at the upper aspect of the conveyer belt (80) and comprises a container (61) which has communicated upper and lower filling guide chutes (62, 63). An upper mixing roller (64) driving in rotation is movably jointed into the upper filling guide chute (62). A lower filling guide roller (65) driving in rotation is movably jointed in the lower filling guide chute (63). The rotations of the upper mixing roller (64) and the lower filling guide roller (65) guide the filling (90) in the upper filling guide chute (62) into the lower filling guide chute (63) to be evenly sprinkled outwardly through a filling guide outlet (68) of the container (61) and fell onto the surface of the layer of oil (W1).

As indicated from FIGS. 10 to 13, an inclined roller (40) driving in rotation is slantly mounted at the upper aspect of the conveyer belt (80) and situated on the rear side of the soft scraper (30) for rolling the dough skin (W) conveyed forwardly by the conveyer belt (80) into the dough bar (W2).

As indicated from FIGS. 14 to 17, a cutting device (50) disposed at the lower aspect of the outlet end of the conveyer belt (80) mainly comprises a plurality of cutting tools (52) held inside a tray (54). When the cutting tools (52) are activated, the thrust sliding between the cutting tolls (52) form a center through hole (53) allowing the dough bar (W2) to enter. The enclosure of the cutting tolls (52) closes the center through hole (53) thereby cutting the dough bar (W2) passing the center through hole (53) into a circular cylinder (W3) to be delivered onto a lower conveyer belt (85).

Figure 16:
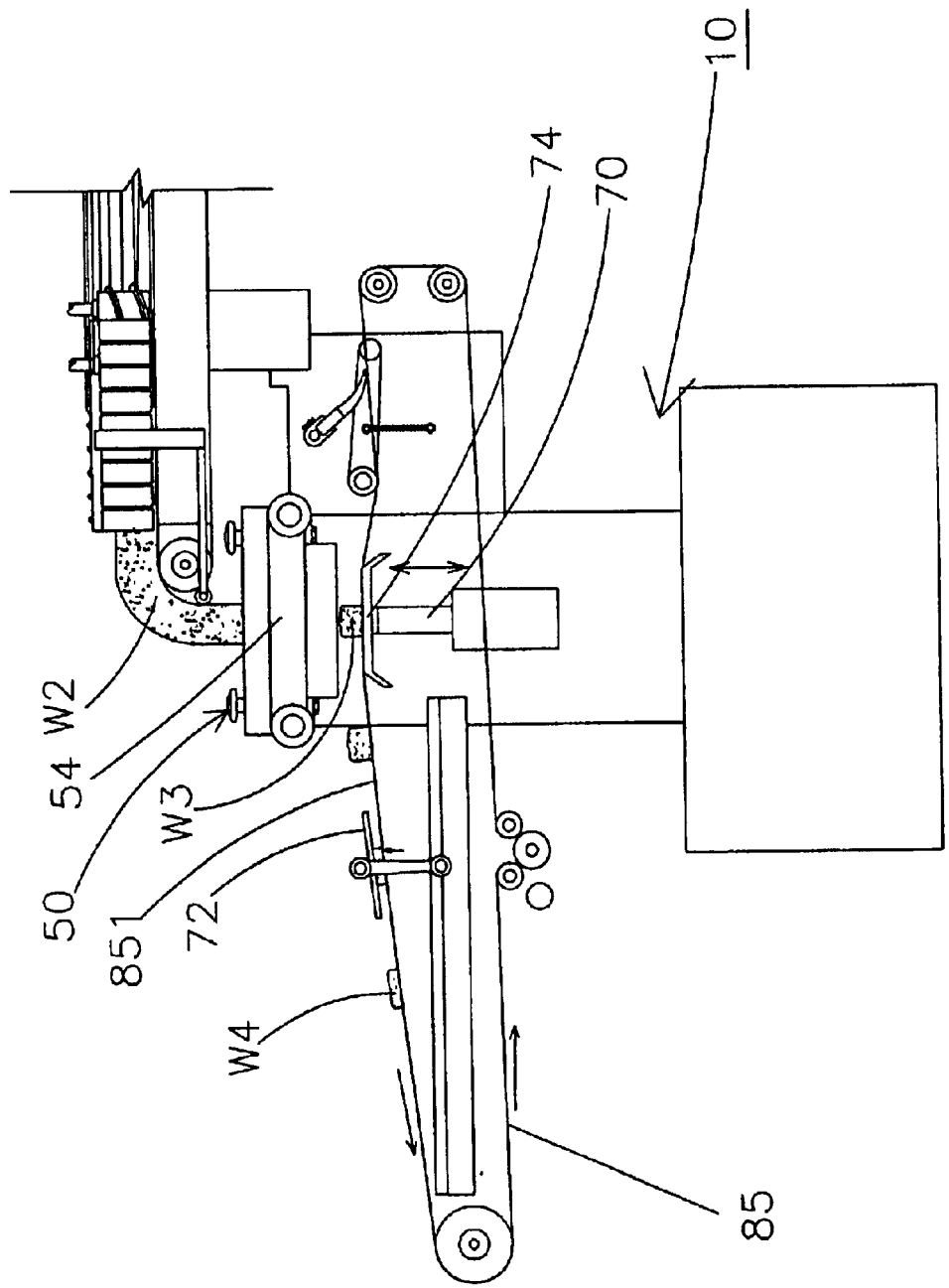
FIG. 16 is a lateral view drawing of an upward movement of an upper belt driven by an ascending push rod of the present invention.
Figure 17:
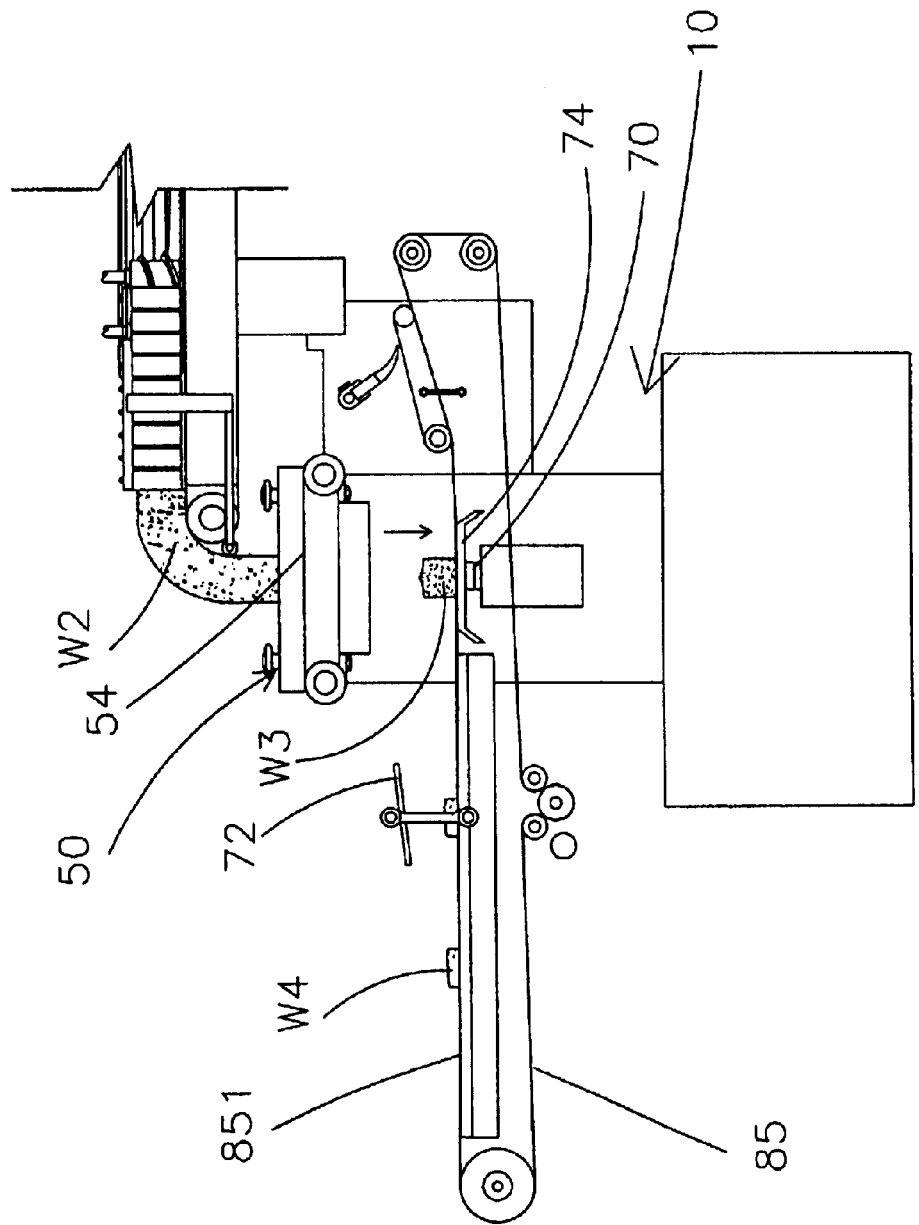
FIG. 17 is a lateral view drawing of a downward movement of the upper belt driven by the descending push rod of the present invention.

According to the main features of the abovementioned device, wherein a press plate (72) is mounted on the lower conveyer belt (85) of the cutting device (50) and capable of displacing and pausing intermittently, as shown from FIGS. 14 to 17. A push rod (70) capable of ascending and descending intermittently, as shown in FIGS. 16 and 17, is disposed in the lower conveyer belt (85) located at the lower aspect of the cutting device (50). A top plate (74) with a larger area is connected at the upper aspect of the push rod (70) and capable of pushing an upper belt (851) upwardly to a proper height.

According to the main features of the abovementioned device, wherein when the push rod (70) ascends, the upper belt (851) is lifted by the top plate (74) to joint the distal end of the dough bar (W2) such that when the dough bar (W2) is cut into the circular cylinder (W3) by the cutting tool (52), the descending of the top plate (74) makes the upper belt (851) receive the circular cylinder (W3) and descend; at the same time, the cut and molded circular cylinder (W3) is conveyed forwardly through an in-time activation of the upper belt (851); wherein, the ascending of the top plate (74) synchronously drives the upper belt (851) to elevate the circular cylinder (W3) located at the lower aspect of the press plate (72) and push it against the lower surface of the press plate (72) thereby pressing and deforming the circular cylinder (W3) into a dough chunk (W4) to be conveyed outwardly.

According to the main features of the abovementioned device, wherein, the circular cylinder (W3) is pressed to deform as the dough chunk (W4), according to the need, to be conveyed outwardly; the cross section of the dough chunk (W4) has ring-shaped layers of oil (S1) and layers of granulated filling (90).

According to the main features of the abovementioned device, wherein a needle rod (45) is mounted at the lower aspect of the inclined roller (40).

According to the main features of the abovementioned device, wherein the granulated fruit and vegetable filling (90) is made of chopped green onion, fruit or cooked bean.

Figure 19:
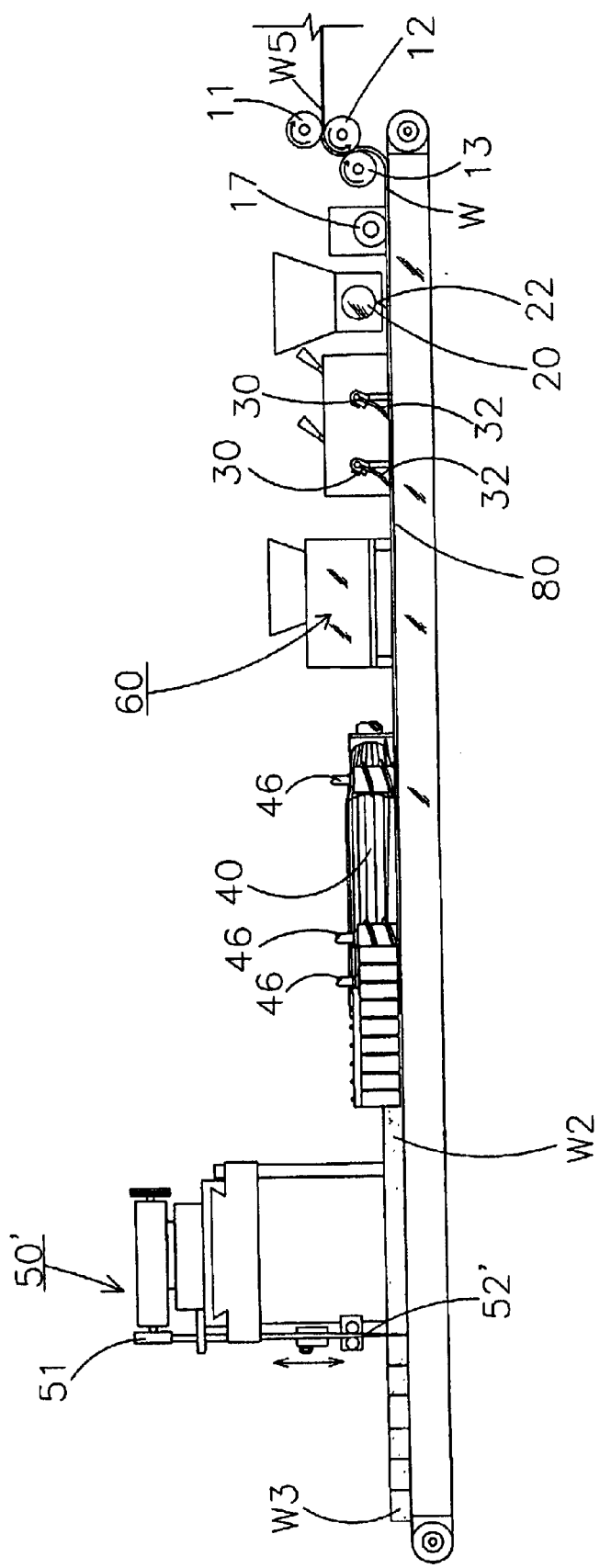
FIG. 19 is a partial and pictorial drawing of the cutting device of the present invention replaced by a cutting table.
Figure 20:
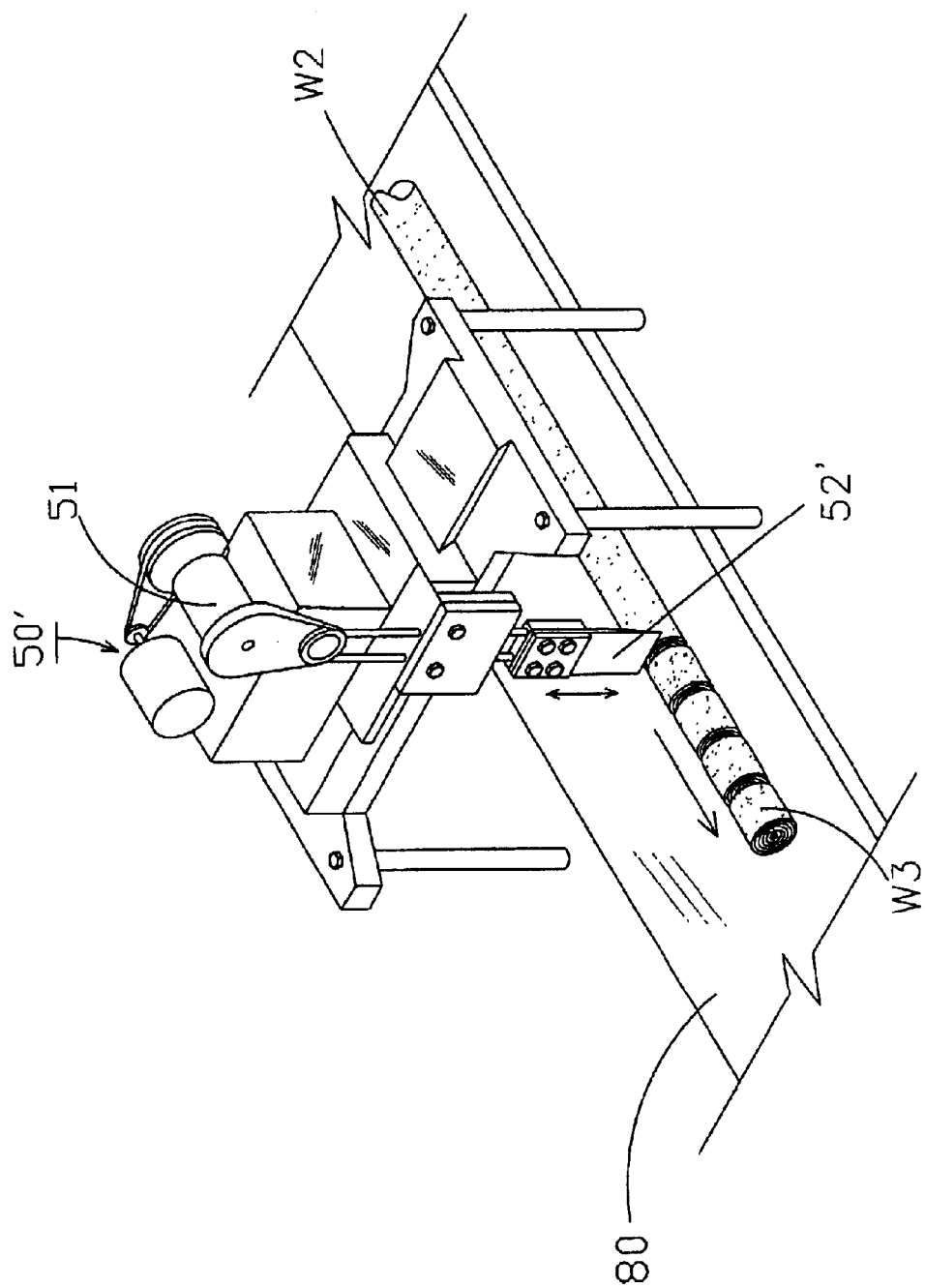
FIG. 20 is a lateral view and schematic drawing of the cutting device of the present invention replaced by the cutting table.

According to the features of the abovementioned device, wherein the cutting device (50) is replaced by a cutting table (50'), as shown in FIGS. 19 and 20. The cutting table (50') is mounted at the upper aspect of the rear segment of the conveyer belt (80); the lateral side of the cutting table (50') connects with a cutting knife (52') capable of displacing up and down as well as longitudinally. When the cutting knife (52') displaces downwardly to a lower dead point, it cuts the dough bar (W2) on the conveyer belt (80) into the circular cylinder (W3).

Figure 3:
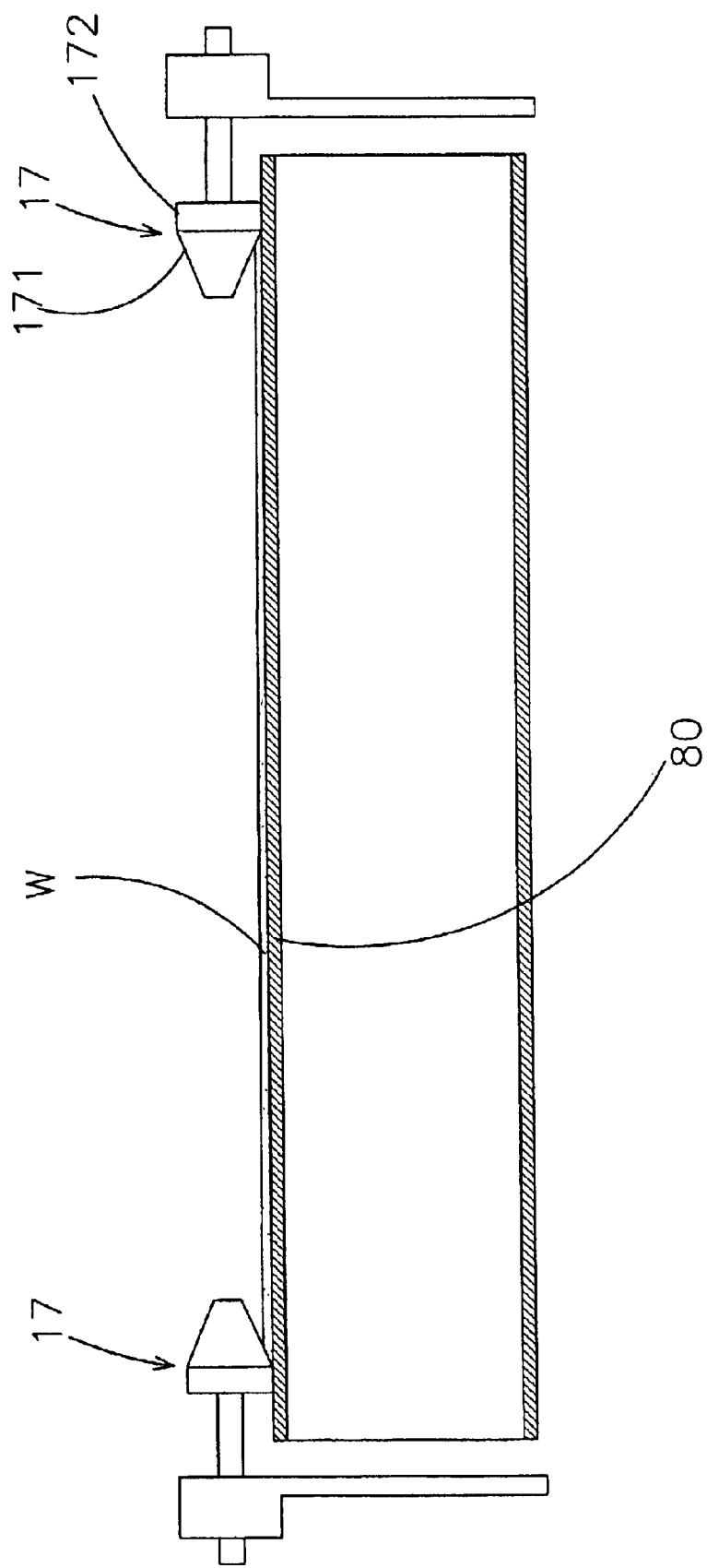
FIG. 3 is a cross-sectional drawing of two sides of a moving dough skin positioned and limited by a conic roller of the present invention.

The exemplary embodiment of the present invention is described as follows:

(1) As indicated in FIGS. 1 and 3, the dough strap (W5) is mangled by a plurality of rollers (11, 12, 13) into the thin dough skin (W) of certain thickness to fall on the conveyer belt (80) and be conveyed toward the conveyer tube (20). As shown in FIG. 3, the conic rollers (17) spin freely. When the thin dough skin (W) is conveyed along with the conveyer tube (20), the conic body (171) of the conic rollers (17) contacts with the surface of the thin dough skin (W) and rotates passively; constant diameter wheels (172) on the lateral sides of the conic rollers (17) roll and press two sides of the conveyer belt (80) thereby efficiently preventing the abnormal left and right movements of the thin dough skin (W) and controlling the constant breadth of the dough skin (W). As shown in FIG. 4, the conveyer tube (20) has cooking oil (S), such as shortening, provided by other equipment and conveyed outwardly by the guide hole (22); the cooking oil (S) is in the shape of a bar or a strap to be continuously spread on the surface of the dough skin (W) moving forwardly. Referring to FIG. 5, a plurality of soft scrapers (30) or brushes are mounted at the upper aspect of the conveyer belt (80) through a shaft portion (31); the soft scraper (30) uses the shaft portion (31) as the center to set and position at a certain angle thereby enabling the lower rim of the soft scraper (30) to efficiently contact with the cooking oil (S) in the shape of a bar or strap. The bar-shaped cooking oil (S) plastered by the lower rim is thin, flat and evenly spread on the surface of the dough skin (W) to form the layer of oil (S1).

Figure 6:
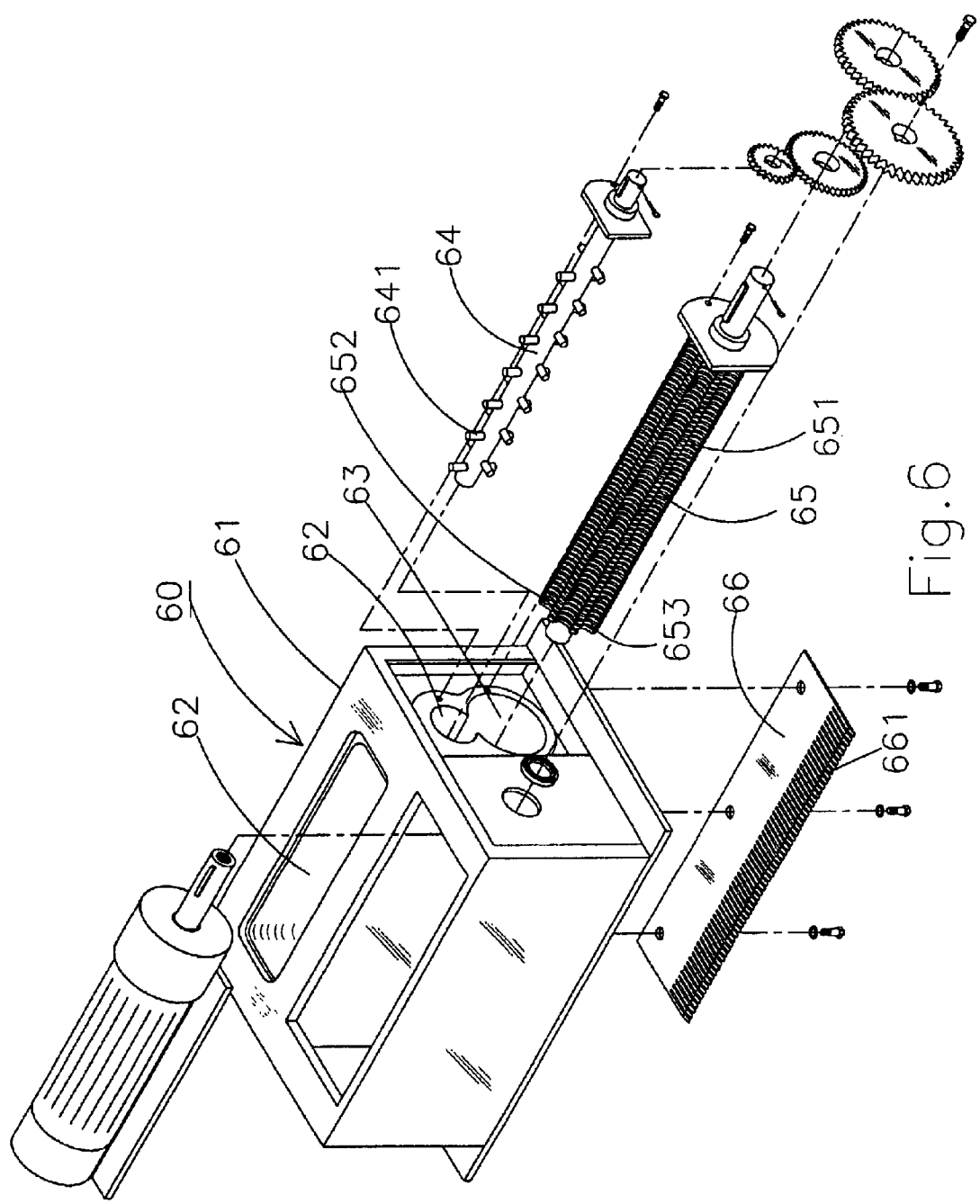
FIG. 6 is a pictorial and exploded drawing of a granulated filling sprinkler device of the present invention.
Figure 7:
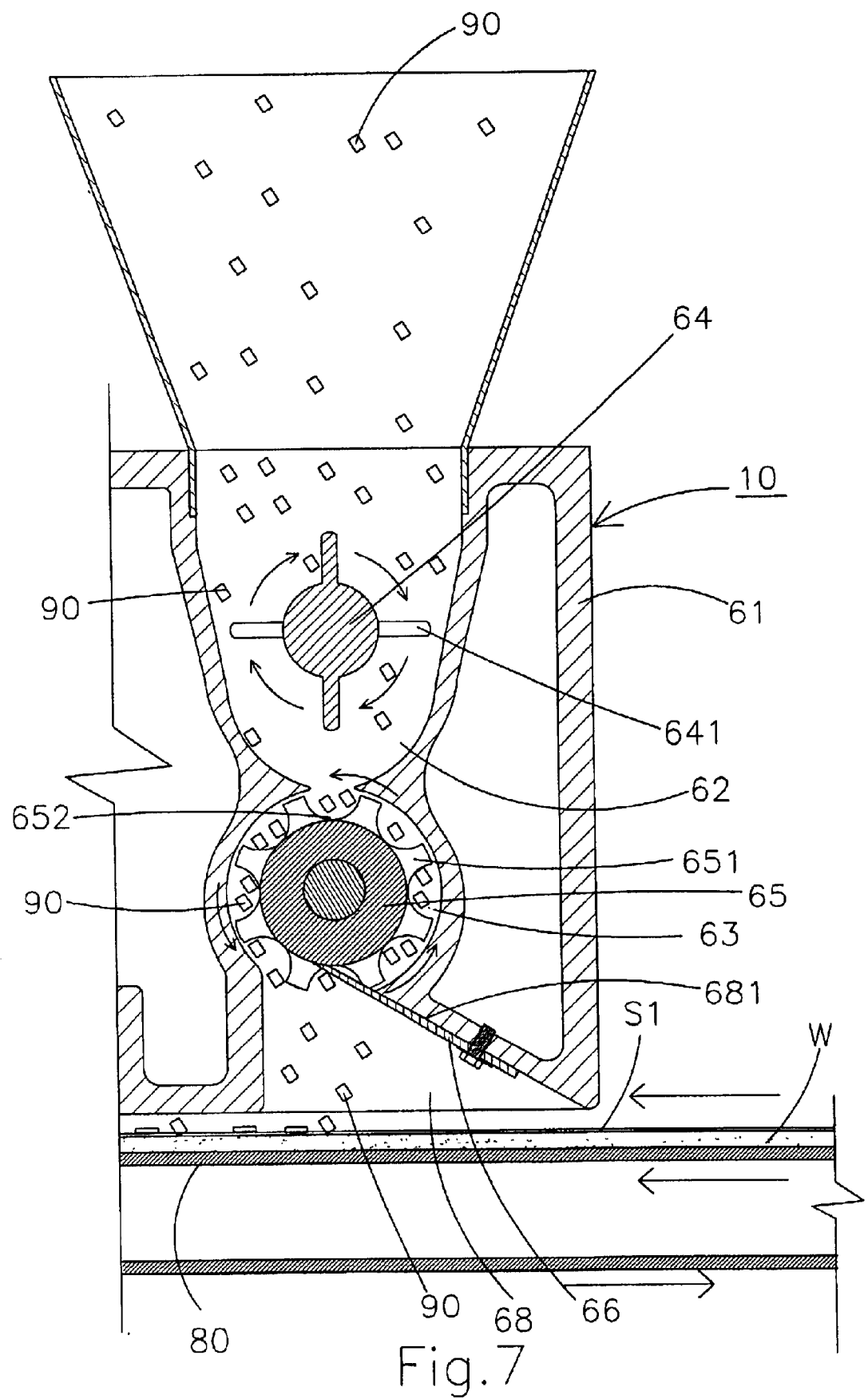
FIG. 7 is a cross-sectional drawing of an exemplary embodiment of the granulated filling sprinkler device of the present invention.
Figure 8:
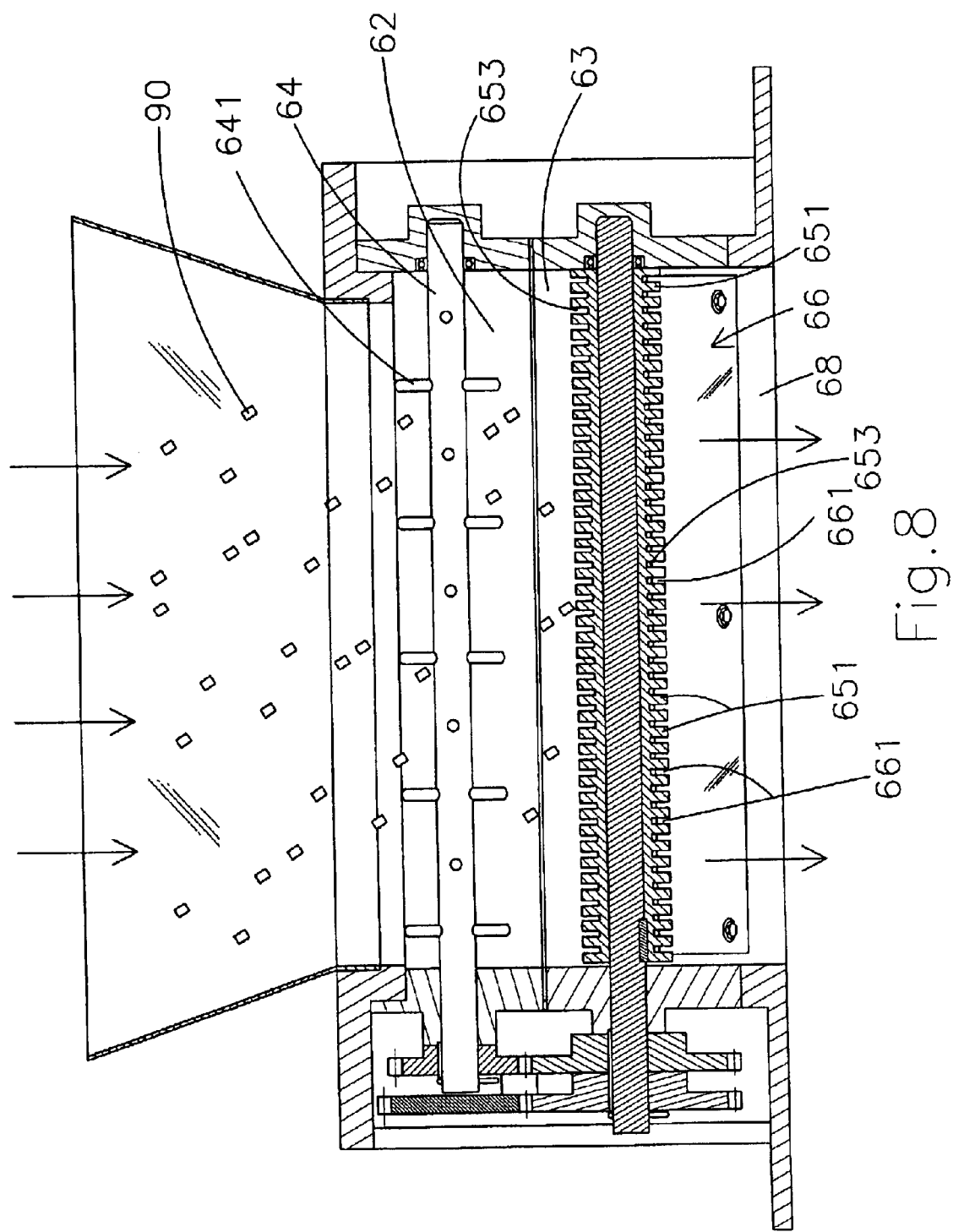
FIG. 8 is a cross-sectional drawing of another exemplary embodiment of the granulated filling sprinkler device of the present invention.

(2) FIGS. 6, 7 and 8 shows the filling sprinkler device (60). The granulated the fruit and vegetable filling (90) has a plurality of chopped green onion or cooked beans and is provided in a container (61). The upper missing roller (64) has a plurality of convex posts (641) capable of evenly mixing the filling (90) so as to prevent the filling (90) from gathering at certain position of the upper filling guide chute (62). Through the function of the driving rotation of the upper mixing roller (64), the filling (90) is evenly brought into the lower filling guide chute (63).

The lower filling guide roller (65) comprises a plurality of longitudinal dividing pieces (651); the outer peripheral rim of the dividing piece (651) has a plurality of arcuate concave portions (652); a ring-shaped gap (653) is disposed between the adjacent dividing pieces (651).

Figure 9:
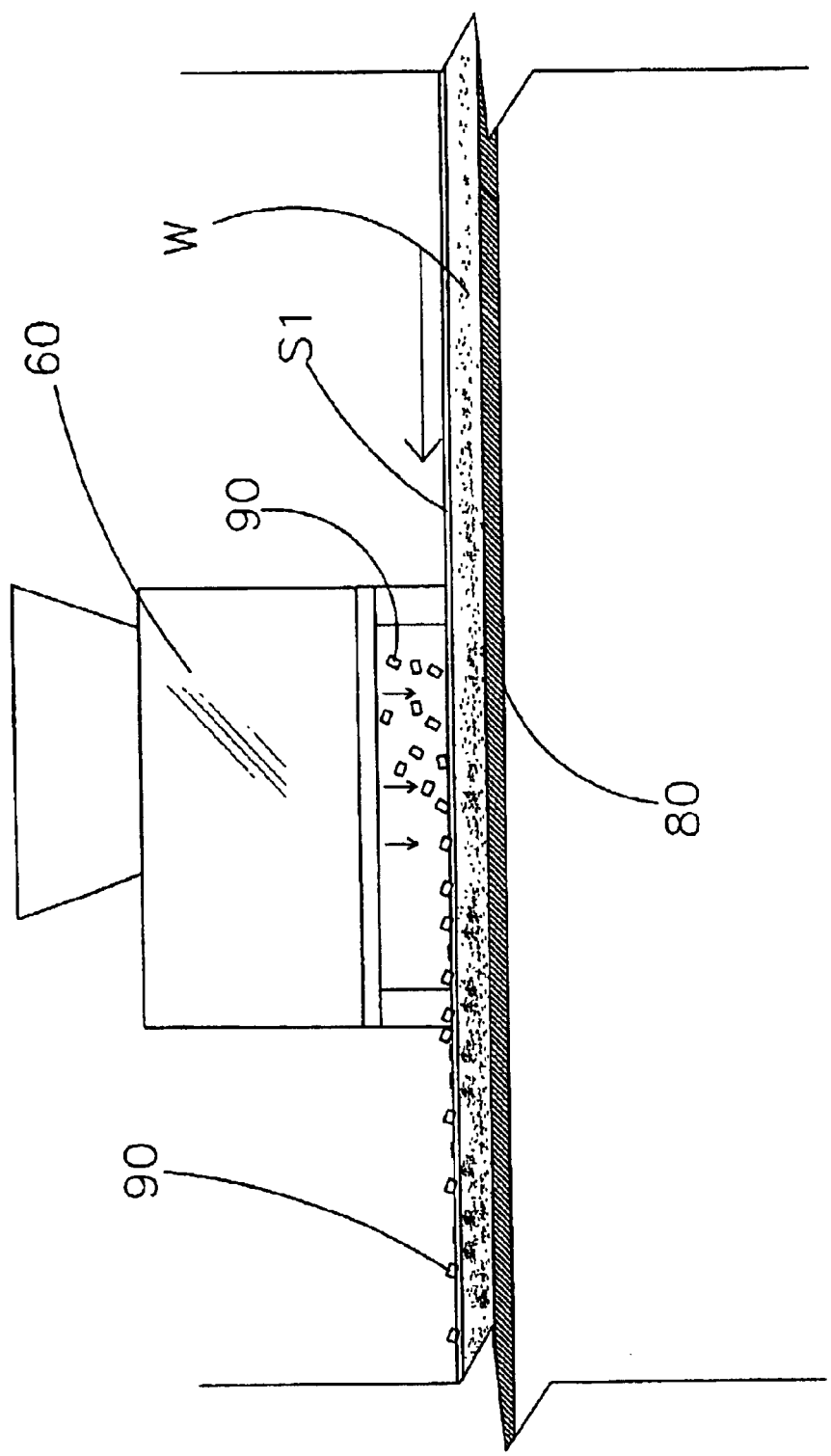
FIG. 9 is a lateral view drawing of the exemplary embodiment of the granulated filling sprinkler device of the present invention.
Figure 10:
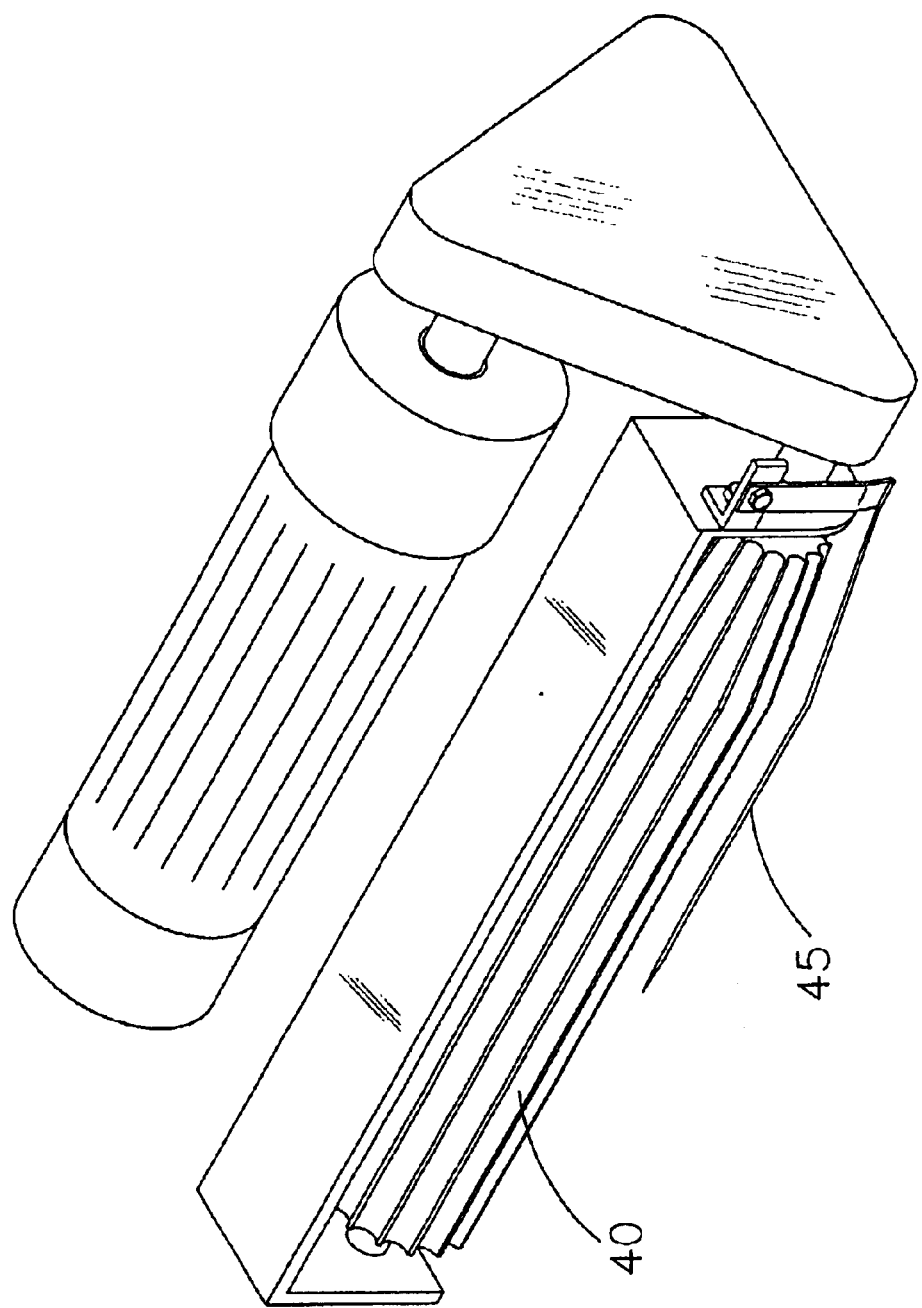
FIG. 10 is a pictorial drawing of an inclined roller of the present invention.
Figure 11:
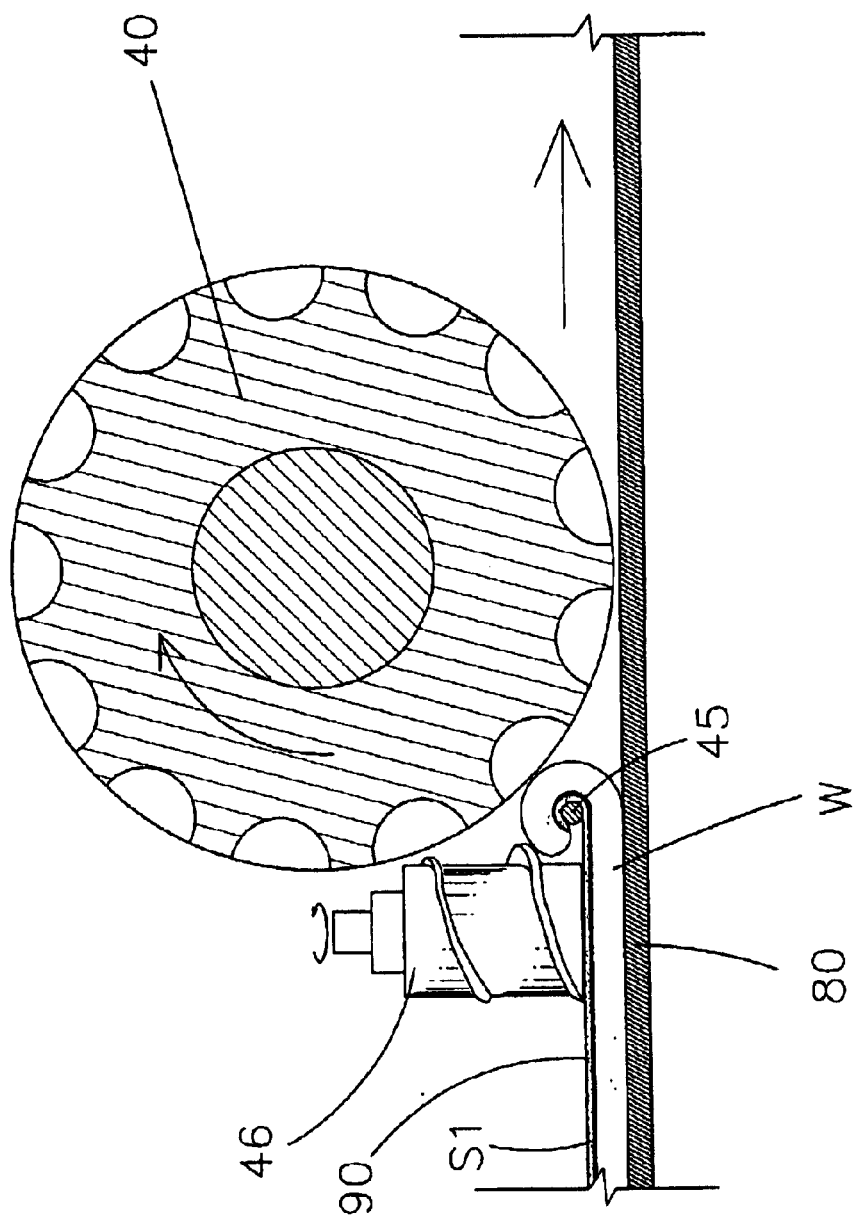
FIG. 11 is a cross-sectional drawing of the dough skin to be rolled up by the inclined roller of the present invention.
Figure 12:
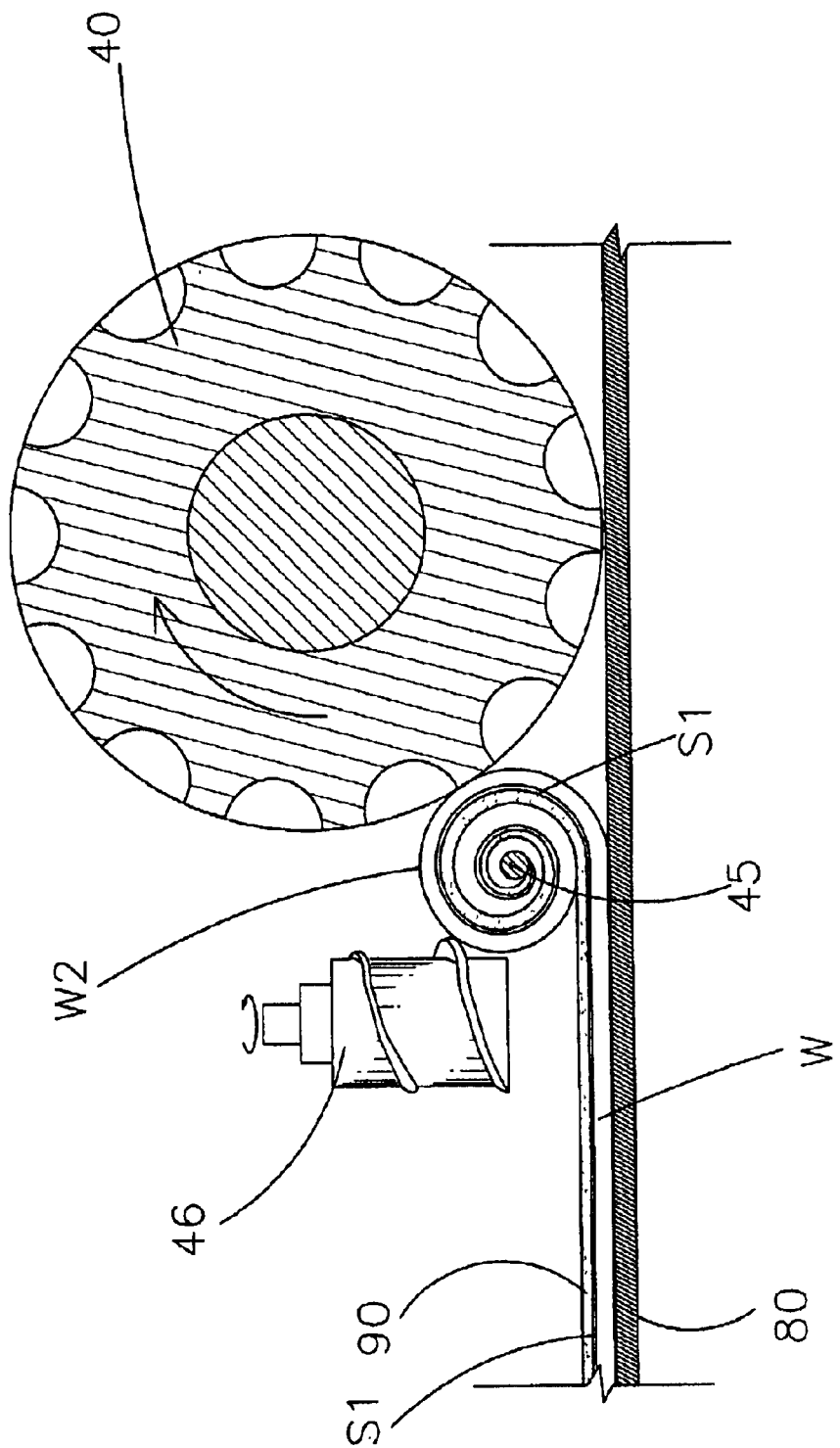
FIG. 12 is a cross-sectional drawing of the dough skin being rolled up by the inclined roller of the present invention.
Figure 13:
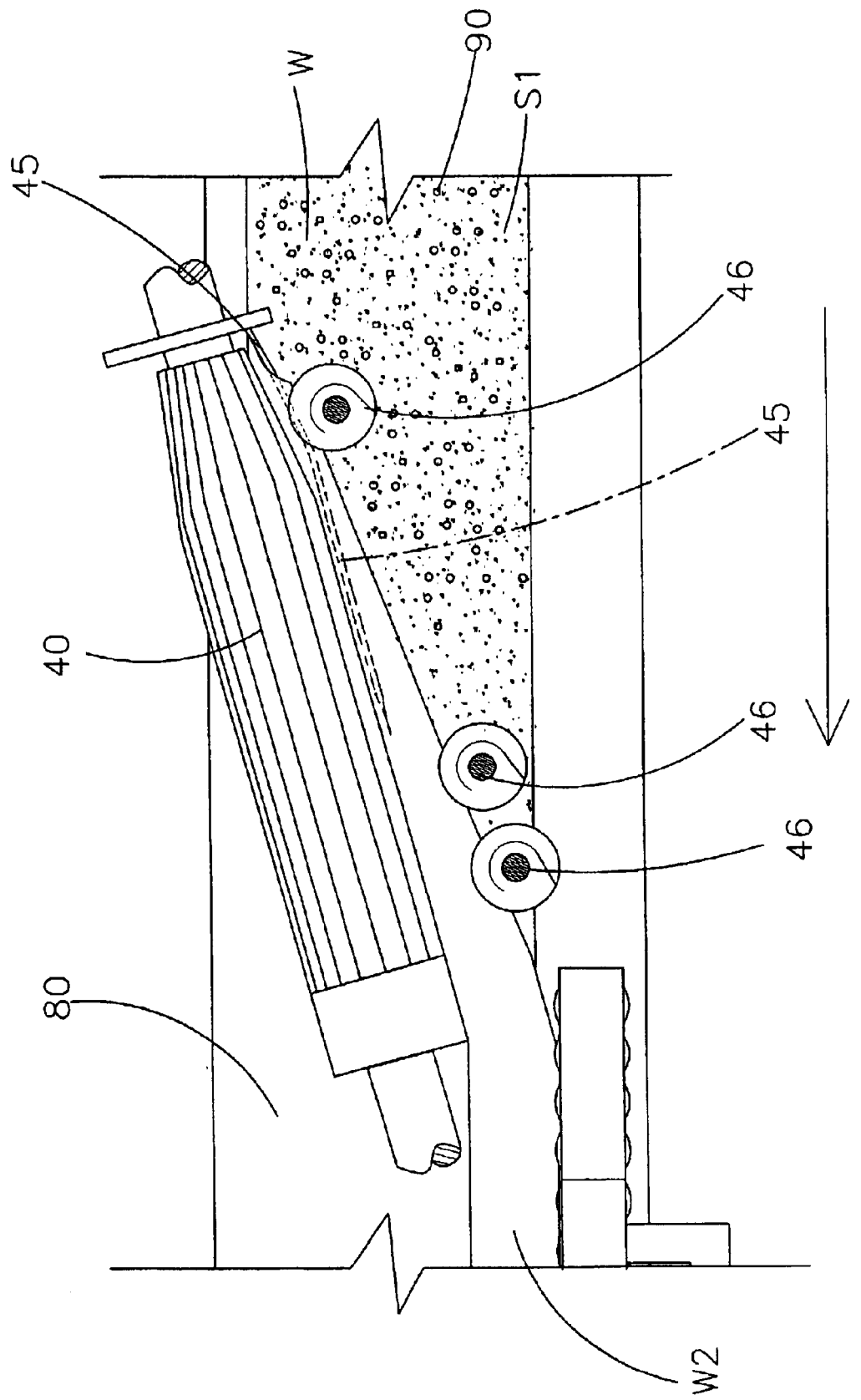
FIG. 13 is a birds-eye view drawing of the inclined roller of the present invention rolling the dough skin into a bar shape.
Figure 14:
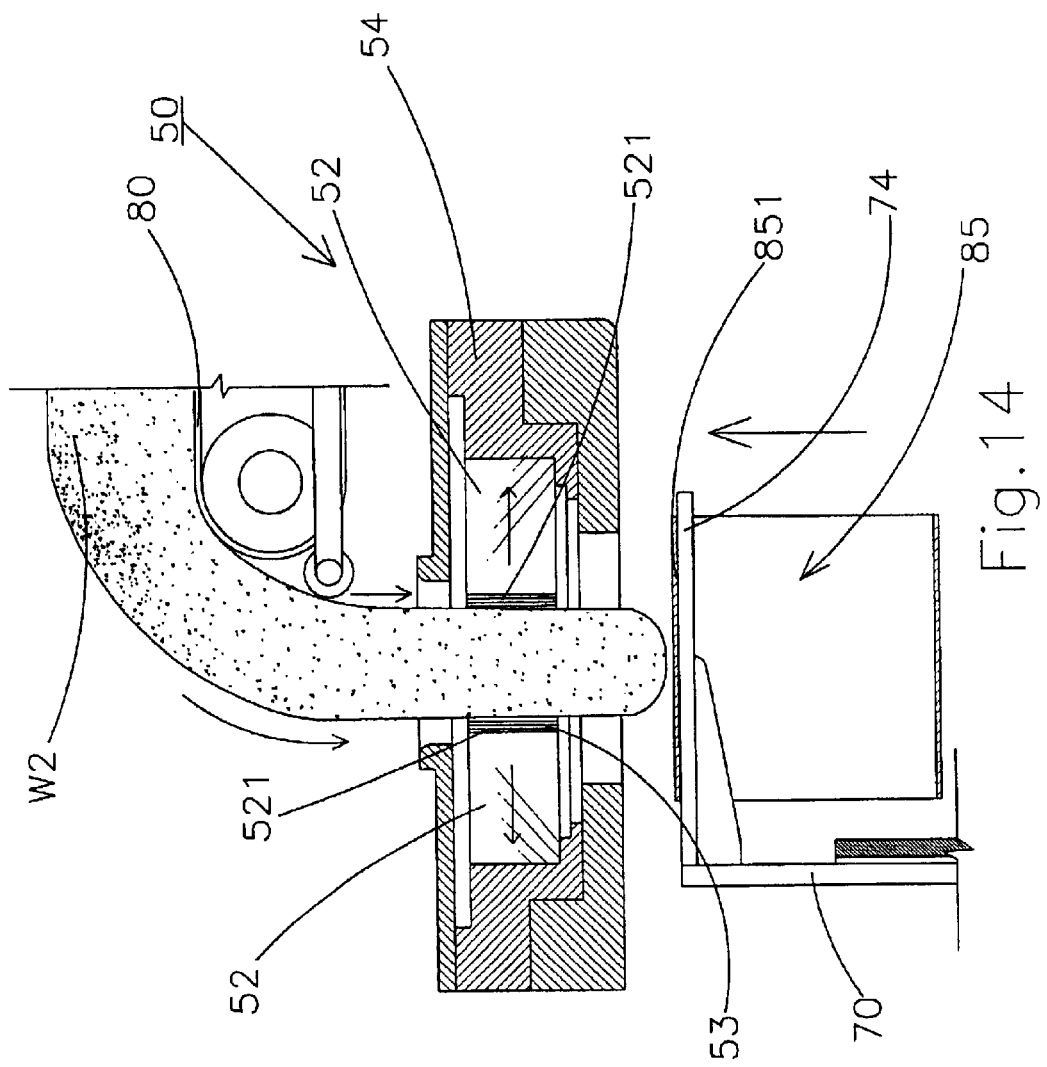
FIG. 14 is a cross-sectional drawing of the dough bar passing through a central hole of the cutting device of the present invention before being cut.
Figure 15:
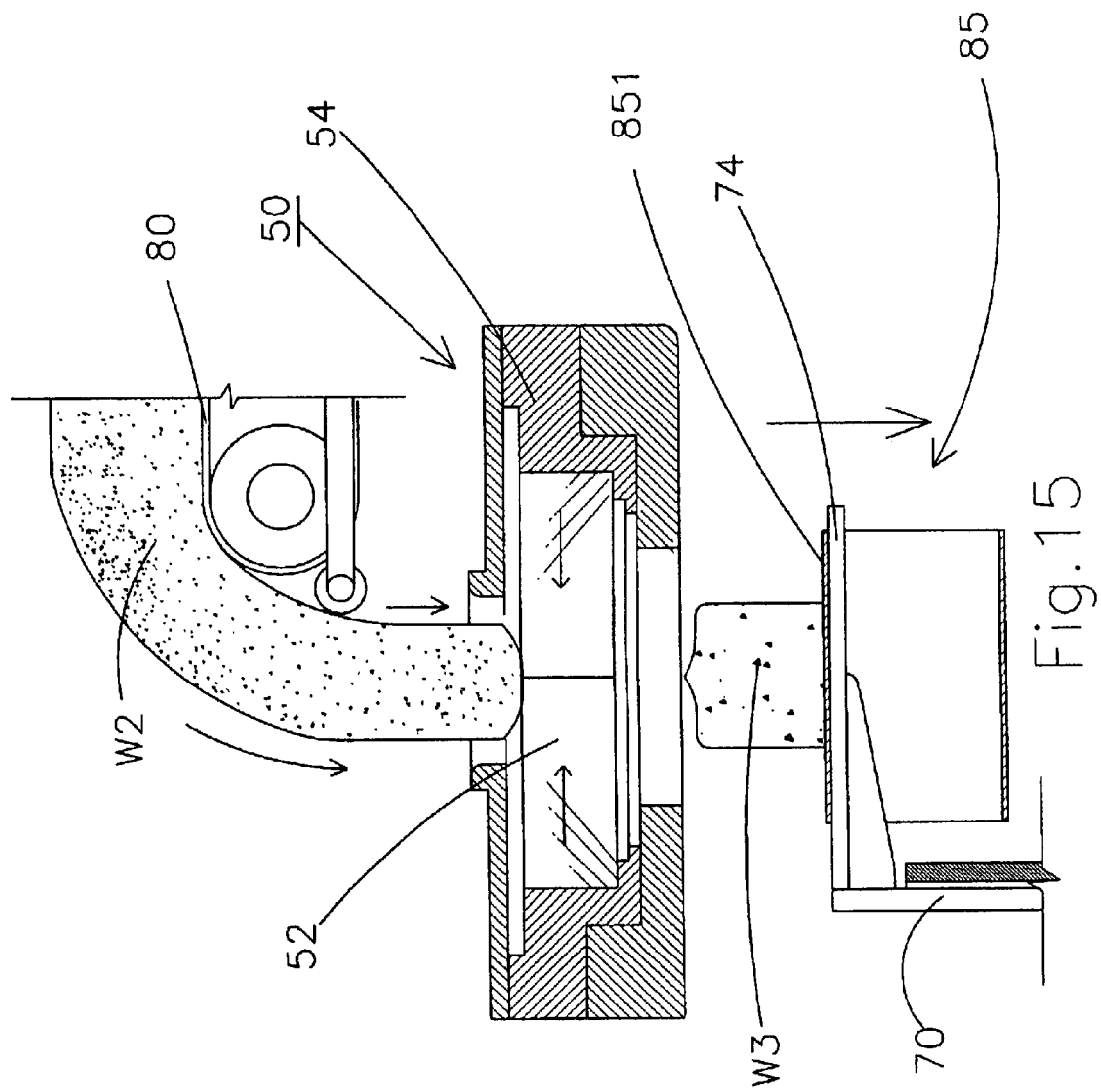
FIG. 15 is a cross-sectional drawing of the dough bar been cut into a circular cylinder by the cutting device of the present invention.

A filling scoop plate (66) is fixed on a wall surface (631) outside the lower filling guide chute (63) and has a plurality of small convex strips (661) at the front end of the filling scoop plate (66) to affix into the ring-shaped gap (653). Therefore, when the filling (90) falls into the arcuate concave portion (652), the fine granulated filling (90) might fall into the ring-shaped gap (653). The rotation of the lower filling guide roller (65) flaps the filling (90) to fall outwardly through the outlet (68) at the lower aspect of the filling sprinkler device (60); wherein the filling (90) located in the ring-shaped gap (653) is scooped out by the fixed and unmovable small convex strips (661) to fall outside the outlet (68). Therefore, all of the filling (90) fell out from the outlet (68) is evenly spread on the layer of oil (W1) on the surface of the dough skin (W), as shown in FIG. 9.

The inclined roller (40) driving in rotation is slantly mounted at the upper aspect of the conveyer belt (80) at the rear aspect of the filling sprinkler device (60), as shown in FIGS. 10, 11, 12 and 13); wherein the bottom lateral side of the inclined roller (40) is disposed with the transverse needle rod (45); the rotating inclined roller (40) contact the forwarding dough skin (W) to make the dough skin (W) roll reversely. To use the differential principle to roll and form the dough bar (W2) is of a conventional principle and won't be further described. The needle rod (45) efficiently positions the end portion of the dough skin (W) which is just rolled reversely to make the internal structure of the dough bar (W2) in a roll-shape tighter with no gaps left; wherein a helical roller (46) rotates actively and is mounted on the lateral side of the inclined roller (40); the lateral and helical thread of the helical roller (46) fitly corresponds to the rolled lateral side of the dough skin (W) thereby preventing the abnormal displacement of the just molded or already molded dough bar (W2) and rolling as well as molding the dough bar (W2) more specifically and tightly. As indicated from FIGS. 14 to 17, the molded dough bar (W2) in a constant diameter is conveyed through the conveyer belt (80) to the outlet end and fall into the cutting device (50). The cutting device (50) mainly comprises a plurality of cutting tools (52) held in the inner circular concave slot of the tray (54). The lateral wall surfaces of the cutting tools (52) slide actively or passively, left or right, to transmit the moment of force thereby enabling a plurality of cutting tools (52) to open the center through hole (53) for the extension of the dough bar (W2), or to close a plurality of cutting tools (52) for shutting the center through hole (53) thereby enabling the knife portion (521) of the cutting tools (52) to cut the dough bar (W2) into the circular cylinder (W3). The cutting device (50) is of a conventional structure of molding food into spherical shapes and the related detail technique won't be further described. At this moment, the circular cylinder (W3) is ready to be used as the dough chunk (W4) during the forward operation of making the green onion crepe.

Figure 18:
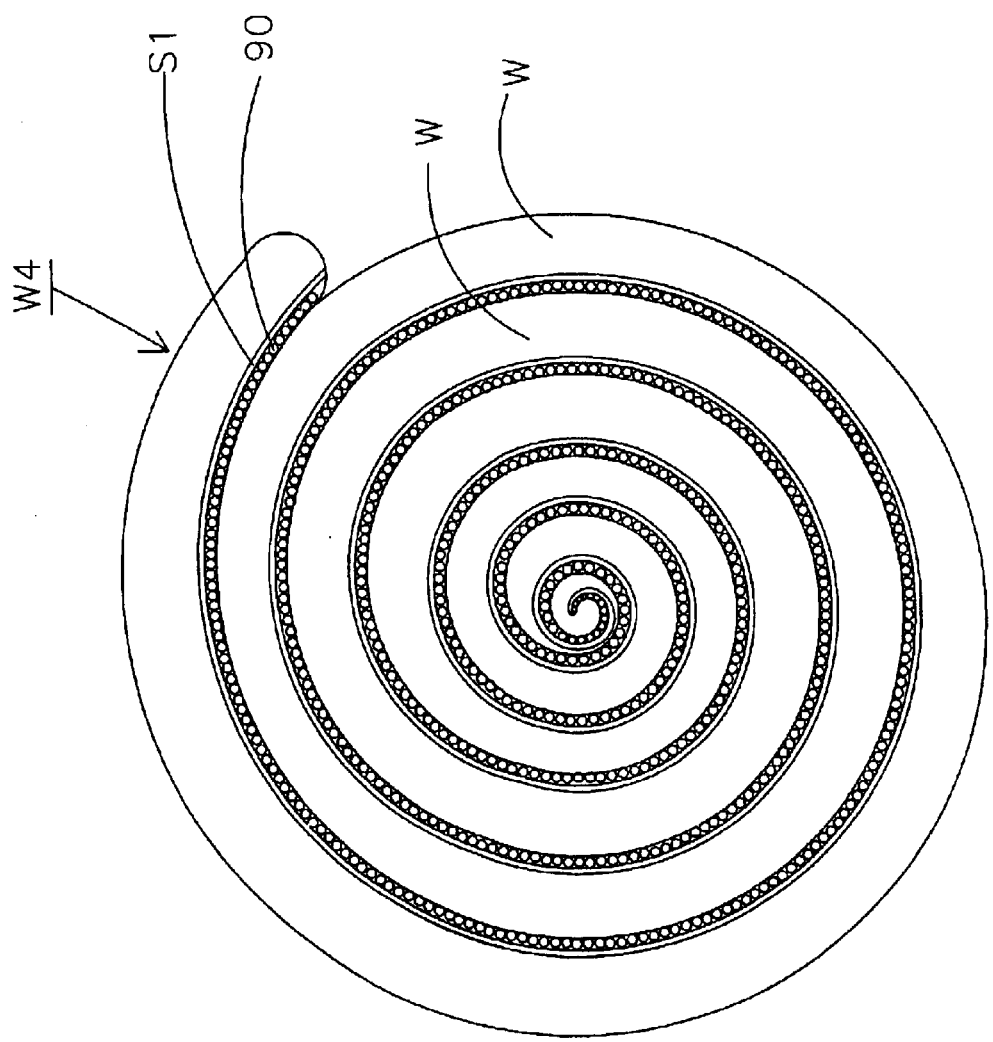
FIG. 18 is a cross-sectional drawing of a dough chunk manufactured by the present invention.

(3) As indicated from FIGS. 14 to 17, another feature of the present invention is to dispose a conveyer belt (85) at the lower aspect of the cutting device (50) and a push rod (70) at the lower aspect of the upper belt (851) of the conveyer belt (85). The dynamic force drives the push rod (70) to intermittently ascend or descend; at the same time, the conveyer belt (85) also moves forward or pauses intermittently. When the push rod (70) ascends, the conveyer belt (85) stops moving forward; the top plate (74) synchronously ascends along with the push rod (70) thereby elevating the upper belt (851) upwardly to connect with the distal end of the dough bar (W2). After the cutting tools (52) closes and the knife portion (521) fitly cuts and molds the dough bar (W2) into the circular cylinder (W3), the cutting tools (52) open to unclose the center through hole (53); at this time, the push rod (70) descends and the upper belt (851) receives the cut circular cylinder (W3) and descends synchronously; in addition, the conveyer belt (85) is activated to convey the circular cylinder (W3) forwardly. In order to provide the enhanced effect of mangling the circular cylinder (W3) again, one of the circular cylinders (W3) is set to locate at the lower aspect of the press plate (72). When the upper belt (851) is elevated again, it synchronously lifts the circular cylinder (W3) upwardly to press onto the bottom surface of the press plate (72) such that the circular cylinder (W3) is pressed flat and deformed into the dough chunk (W4). The inner portion of the dough chunk (W4) is covered evenly by the shortening and the granulated fruit and vegetable filling (90). As shown in FIG. 18, the layers of shortening (S1) and the filling (90) are evenly spread in ring shapes on the ring-shaped dough skin (W). By virtue of the present invention, the user only has to slightly press and expand the dough chunk (W4) to make it the forward material for making the green onion crepe.

(4) The cutting device (50) of the present invention aiming to cut the dough bar (W2) into the circular cylinder (W3) is replaced by a cutting table (50'), as shown in FIGS. 19 and 20. A driving structure (51) of the dynamic force on the cutting table (50') drives the cutting knife (52') to displace up and down intermittently. When the cutting knife (52) displaces downwardly to the lower dead point, it fitly cut the dough bar (W2) at the lower aspect into a plurality of circular cylinders (W3). The cutting table (50') used in this exemplary embodiment can completely replace the previously mentioned cutting device (50).

In summation of the abovementioned, the manufacturing method, steps and the achieved effect of the present invention are obviously advanced and innovative. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A method of making dough mixed with cooking oil, granulated fruit and vegetable filling comprises the following steps:
   (a) providing a thin dough skin to be continuously conveyed through a conveyer belt toward a determined direction;
   (b) continuously providing a plurality of bar-shaped or strap-shaped cooking oil onto the dough skin to have at least one bar of cooking oil spread on the dough skin;
   (c) evenly plastering the bar-shaped cooking oil into an even and thin layer on the surface of the dough skin;
   (d) evenly and downwardly sprinkling a layer of the fruit and vegetable filling on the layer of oil;

(e) rolling the dough skin conveyed forwardly into a dough bar thereby evenly covering the layer of oil as well as the layer of fruit and vegetable filling in ring shapes inside the dough bar; and (f) sequentially cutting the dough bar conveyed continuously into a plurality of circular cylinders.

2. A method of making dough mixed with cooking oil, fruit and vegetable filling according to claim 1, wherein, the circular cylinder is pressed to deform as a dough chunk, to be conveyed outwardly; the cross section of the dough chunk has ring-shaped layers of oil and layers of granulated filling.

3. A method of making dough mixed with cooking oil, fruit and vegetable filling according to claims 1, wherein the granulated fruit and vegetable filling is made of chopped green onion, fruit or cooked bean.

* * * * *